July 6, 1965 E. W. SCHATZMAN 3,192,802
TORQUE CONTROL MECHANISM
Filed Dec. 4, 1962 5 Sheets-Sheet 3

INVENTOR.
EDWARD W. SCHATZMAN
BY
Joseph A. Prane
Attorney

United States Patent Office 3,192,802
Patented July 6, 1965

3,192,802
TORQUE CONTROL MECHANISM
Edward W. Schatzman, South Fort Mitchell, Ky., assignor to The Avey Division of The Motch & Merryweather Machinery Co., Covington, Ky., a corporation of Ohio
Filed Dec. 4, 1962, Ser. No. 242,312
8 Claims. (Cl. 77—32.7)

This invention relates to improvements in torque control mechanism and particularly to improvements in high speed or sensitive drilling machines.

In the use of high speed or sensitive drilling machines, particularly where relatively small diameter drills are employed, caution and care must be exercised to avoid undue torque on the drill to avoid breakage thereof. The said torque may be developed or caused by hard spots in the work, chips developed during the drilling operation, swelling of the drill due to friction heat, or for any other reason or cause developing during the drilling operation. The drills are designed and made to withstand the normal torque thereon during drilling but may not withstand the added torque resulting from the above causes.

In the past, devices have been provided to safeguard the drill against breakage due to the above causes, there being one such device disclosed in United States Patent 2,562,170 which issued on July 31, 1951, in the name of Edward J. Busemeyer for Machine Tool. This device while successfully accomplishing its intended purpose was found to be slightly awkward in adjustment and at the same time occasionally failed to maintain its adjustment while in use.

The device disclosed in this application overcomes the shortcomings of the above referred to Busemeyer device.

The principal object of the present invention is, therefore, the provision of a machine tool, specifically a drilling machine, in which use is made of a torque control mechanism that is exceedingly sensitive.

Another object of this invention is the provision of a torque control mechanism for a machine tool that can be readily and accurately adjusted to the working conditions at hand.

A still further object of the present invention is the provision of a torque control mechanism that accomplishes the foregoing objects that can be securely and positively locked in adjusted positions so as to withstand repeated operations over long periods of time.

A still further object of the present invention is the provision of a torque control device for use, particularly, with high speed or sensitive drilling machines that is economical to produce without sacrificing efficiency and dependability while in operation.

Other objects and advantages of the present invention should be readily apparent by reference to the following specification considered in conjunction with the accompanying drawings forming a part thereof and it is to be understood that any modifications may be made in the exact structural details there shown and described, within the scope of the appended claims, without departing from or exceeding the spirit of the invention.

In the drawings:

FIG. 14 is a fragmentary, sectional view through part of the automatic control means for the machine as seen from line 14—14 on FIG. 13.

FIG. 16 is a fragmentary view taken on line 16—16 on FIG. 5 and disclosing a detail in the construction.

FIG. 17 is an enlarged, sectional view through one of the control dogs of the machine as seen from line 17—17 on FIG. 2.

FIG. 18 is an enlarged view of a portion of FIG. 1 and showing the dog control mechanism with certain parts cross-sectioned for clearness in illustration and operation.

Throughout the several views of the drawings, similar reference characters are employed to denote the same or similar parts.

As was noted above, this invention pertains primarily to means or mechanisms for controlling the longitudinal or feed movement of a drill for performing step or deep hole drilling operations, particularly, when the drill used is of small diameter. In the embodiment of the invention herein disclosed there is provided a device, mechanism or machine in which the tool or drill is advanced from an initial position at a rapid rate to the work, fed at a slow rate entirely through or through a part of the work and then rapidly retracted, followed by a rapid advance of the drill or tool to the point where it was previously withdrawn, in the event only a part of the work has been tooled, for a second drilling step whereupon reversal again takes place. This cycle of operation is repeated until the work is completely tooled or drilled in the event that a single feed cycle of the tool or drill does not complete the work.

As was noted above, the purpose of this type of a control mechanism is to permit the clearing of chips from the holes so that they do not interfere with the rotation or operation of the tool or drill or interfere or prevent maintaining the tool or drill in a cool condition. In the case of drilling oil holes in crank shafts, this is very important since such drills are of comparatively small diameter and will not stand a great amount of strain. In this instance, the chips may interfere with the rotation of the drill, thereby setting up a torque on the drill in excess to that which it will stand, causing said drills to be twisted and broken.

By the present invention, means are provided whereby this torque is utilized for effecting the withdrawal of the drill from the hole.

The machine disclosed in the drawings is a single spindle machine, that is, a machine for drilling one hole at a time. It should be noted, however, that a multiple spindle machine may, and in fact has been, produced in which a plurality of drilling heads were employed, thereby simultaneously drilling a comparatively large number of holes, such as the oil holes for all of the bearings of a crank shaft as used in a multiple cylinder internal combustion engine, and in which each drilling head had incorporated therewith the control means to be presently described.

Specifically, the machine shown in the drawings comprises a base or bed 25 having formed on its upper surface a dovetail guide 26 with said base or bed having mounted thereon a work support 27. Any suitable means (not shown) may be provided for securing and adjusting the work support 27 relatve to the base or bed 25 and for clamping the same in position. Mounted on the base or bed upper surface guide 26 is the drilling unit, indicated in its entirety by the reference numeral 28, which includes the body portion or head 29 and a closing plate 30.

The base or bed 25, at its rear end, is provided with an upstanding support 31 to which is secured a motor supporting bracket 32. The motor supporting bracket 32 has a vertical arm 33, disposed against the outer surface of the upstanding support 31, and a horizontal arm 34 on which is secured an electric motor 35. The motor supporting bracket 32 is vertically adjustable through an adjusting screw 36 carried thereby and a cooperating nut 37 on the bed upstanding support 31.

Projecting from the motor 35 is the motor shaft 38 which has keyed or otherwise secured to it a pulley 39 for V belts 40. The belts 40 are, in turn, extended around a spindle driving pulley 41, freely rotatable on anti-friction bearings 42 which encircle a spindle sleeve 43, see FIG. 7. The spindle sleeve 43 is journaled in anti-friction bearings 44 and 45 carried by the upper end of the bed upstanding support 31. The spindle sleeve 43 is provided interiorly thereof, for the portion thereof at 46, with suitable driving keys which enter splines 47 in a tool spindle 48.

Figure 7:
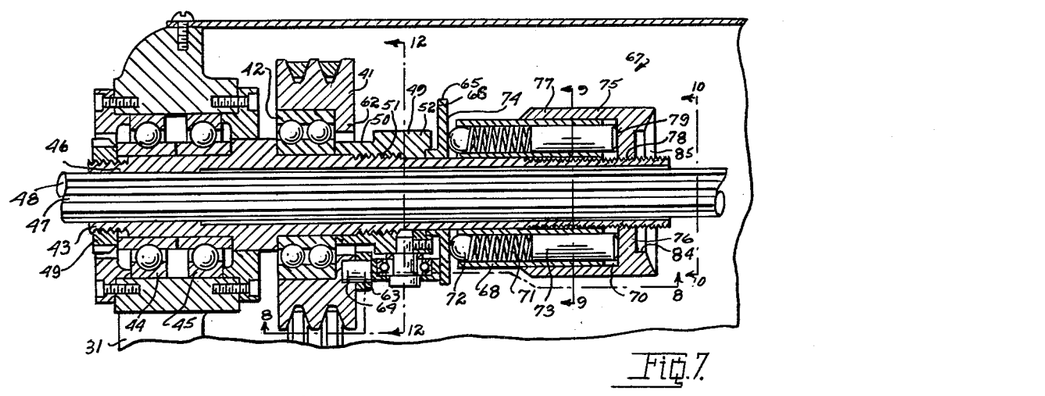
FIG. 7 is an enlarged, sectional view through the spindle driving and torque control mechanism as seen from line 7—7 on FIG. 5.
Figure 8:
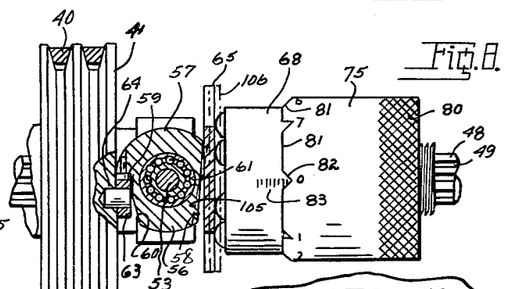
FIG. 8 is a view partly in section and partly in elevation through a portion of the torque mechanism as seen from line 8—8 on FIG. 7.
Figure 9:
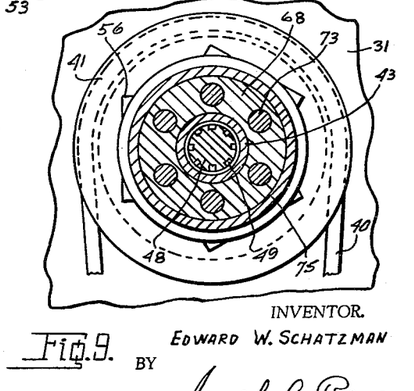
FIG. 9 is a sectional view transversely of the torque mechanism as seen from line 9—9 on FIG. 7.
Figure 10:
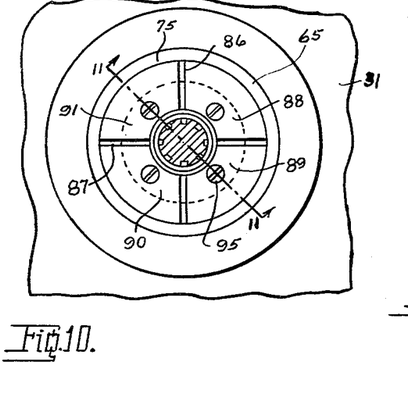
FIG. 10 is essentially an end elevational view of the torque device of the present invention as seen particularly from line 10—10 on FIG. 7.

The spindle driving pulley 41 is substantially cup-shaped and encloses the anti-friction bearing 42. The inner race of the bearing 42 is placed under tension by a nut 49 which has its sleevelike portion 50 in contact with said inner race of the anti-friction bearing 42. The nut 49 is connected with the spindle sleeve 43 through threads 51. The nut 49 includes an enlarged portion 52 which carries the driven means between the said pulley 41 and said spindle sleeve 43. As seen most clearly from FIG. 12 the nut portion 52 has projecting, radially, from equally spaced points around its periphery, three being shown, studs 53, 54 and 55 on each of which is mounted a driven cam or dog 56. Each of said cams or dogs 56 is substantially identical which, as seen in FIGS. 7 and 8 comprises a cylindrical member or roller 57 having at one point on its periphery a flat 58. Diagonally opposite the flat 58 the cam or dog is provided with a radial shoulder or face 59 which terminates in a downwardly and outwardly inclining cam face 60. Each of the cams or dogs is mounted on its stud 53, 54 or 55 through an anti-friction bearing 61.

Projecting rearwardly from the hub 62 of the spindle pulley 41 is an abutment 63 in the nature of a roller secured to the pulley 41 through a stud 64. There are as many abutments 63 as there are cams or dogs 56. Each abutment 63 is positioned on the pulley 41 to engage a wear stud carried by the radial shoulder 59 of its cam or dog roller 57, as seen clearly in FIG. 8.

Rearwardly of the nut 49 and surrounding the spindle driving sleeve 43 is a plate 65 having its forward surface 66 resting, simultaneously, on the flats 58 of each of the cams or dogs 56 with said parts, that is, the flat face 66 of the plate 65 and flats 58 of the cams or dogs 56, held in operative contact by yieldable means indicated in its entirety by the reference numeral 67. The yieldable means 67 comprises a cylindrical member or barrel 68 surrounding the spindle sleeve 43 outwardly of the plate 65 and with said cylindrical member or barrel secured to said sleeve by a set screw 69, see FIG. 11.

Figure 11:
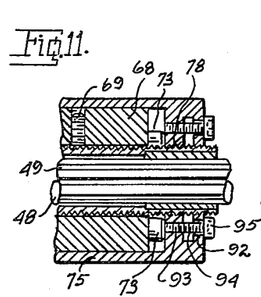
FIG. 11 is a longitudinal, sectional view through the torque control device as seen from line 11—11 on FIG. 10.

The securing of cylindrical member or barrel 68 on the spindle sleeve 43 positions the yieldable means 67, actually a torque device, in operative and working position. The cylindrical member or barrel 68 has extending axially thereof a plurality of parallel similar bores 70, there being six such bores disclosed, with each bore containing a spring 71 abutting on one end with a bearing ball 72 and on its other end with a plunger 73. The bearing balls 72 contact also with the plate 65 on its rear flat face 74 which is opposite to the flat face 66 thereof.

Surrounding the cylindrical member or barrel 68 is a sleeve nut 75 having a body portion 76, nut per se, and a skirt portion 77 extending from the body portion and with said skirt portion covering an appreciable portion of the cylindrical member or barrel. The sleeve nut 75 is threaded at 78 to the spindle driving sleeve 43 for adjustment axially of said sleeve. The sleeve nut body portion 76 has an inner face 79, which, in effect, forms the base of the skirt portion of the nut and it is against this inner face 79 that the inner ends of the plungers 73 rest or contact.

From the foregoing, it will be obvious that actuation of the sleeve nut 75 on the spindle driving sleeve threads 78 towards the cylindrical member or barrel 68 will push the plungers toward the springs 71 and bearing balls 72 for increasing the tension in the springs and spring loading the bearing balls for a purpose subsequently to be made clear. The sleeve nut 75 may be, obviously, turned by any suitable or desirable means, but, preferably, is turned or actuated by hand and for which purpose the sleeve nut is provided with a band of knurling 80, see FIG. 8, to assist the operator in grasping and turning the sleeve nut.

As will be subsequently made clear the amount of tension placed on the springs 71 and bearing balls 72 depends on the tool, particularly, the drill, being used and to assist in setting the said spring and bearing ball tension the leading edge of the sleeve nut skirt portion 77 is tapered to a rather thin edge, as at 81, and said taper 81 provided with markings in the form of notches 82 with said notches individually identified; the disclosure in the drawings having eight notches respectively and consecutively numbered from "0 to 7." Cooperating with said notches are graduations or lines, indicated in the drawings by the reference numeral 83, formed on the outer surface of the cylindrical member or barrel 68 and which graduations or lines are provided with suitable indicia to cooperate with the sleeve nut skirt notches and markings in adjusting and setting said sleeve nut.

The said graduations or lines 83 and sleeve nut notches 82 do not necessarily indicate a torque value but are useful in resetting the torque device on subsequent occasions and to indicate increments of increase and decrease of tension in the springs 71 with regard to the existing tension when an adjustment is being made.

After the sleeve nut 75 has been adjusted to establish the torque on the spindle and its tool the sleeve nut is secured in its adjusted position. Any suitable or desirable means may be employed for this purpose, but since this is a critical part or function of the device the securing or locking means illustrated in the drawings is preferred. Accordingly the body portion 76 of the sleeve nut is provided intermediate its inner face 79 and the outer surface thereof with an undercut 84 thereby providing, in effect, a radial flange 85 at the outer end of the sleeve nut which is, nevertheless, threaded to engage the spindle driving sleeve threads 78. A pair of right angle saw cuts 86 and 87 is formed from the exterior of said sleeve nut body through the radial flange 85 with said saw cuts each passing through the axial center of the sleeve nut to the outer periphery thereof, but with said saw cuts missing the sleeve nut body that is inwardly of the radial flange.

The cross cutting, or sawing, of the sleeve nut radial flange 85 results in the formation of four wings 88, 89, 90 and 91 in said flange 85 and each of said wings 88, 89, 90 and 91 is provided with a plane aperture 92 in axial alignment with a threaded aperture 93 in the sleeve nut body portion inwardly of the flange 85. Extending through each wing plane aperture 92 and into its threaded aperture 93 is the threaded portion 94 of a clamping bolt which has its head 95 exteriorly of the sleeve nut body portion with the flat undersurface of the bolt head against the outer surface of its wings 88–91.

From the foregoing it will now be seen that after the sleeve nut 75 has been adjusted to its desired point the securing or locking bolts 94–95 are actuated in a securing or locking direction for springing the wings 88–91 to cause the screw threads thereof to impinge on the spindle driving sleeve screw threads 78. Obviously, when it is desired to adjust the position of the sleeve nut the locking bolts 94 and 95 are actuated to free their heads from the wings 88–91 and thereby release the same and the sleeve nut from the spindle driving sleeve.

Outwardly projecting from the bed upstanding support 31 is a post 96 having secured to its outer end, as by nuts 97, an angle bracket 98. One leg 99 of the angle bracket 98 has secured to it a micro-electric switch 100 which has pivoted thereto one end of an arm 101. In effect, the arm 101 is secured to an oscillatable stud 102 which actuates the switch contact within the microswitch, not shown, except diagrammatically in FIG. 15, where said switch is indicated in its entirety by the reference numeral 103. The other end of the arm 101 is provided with a roller 104 which rides on the outer flat surface 74 of the plate 65 as clearly illustrated in FIGS. 4 and 5.

Figures 1, 2:
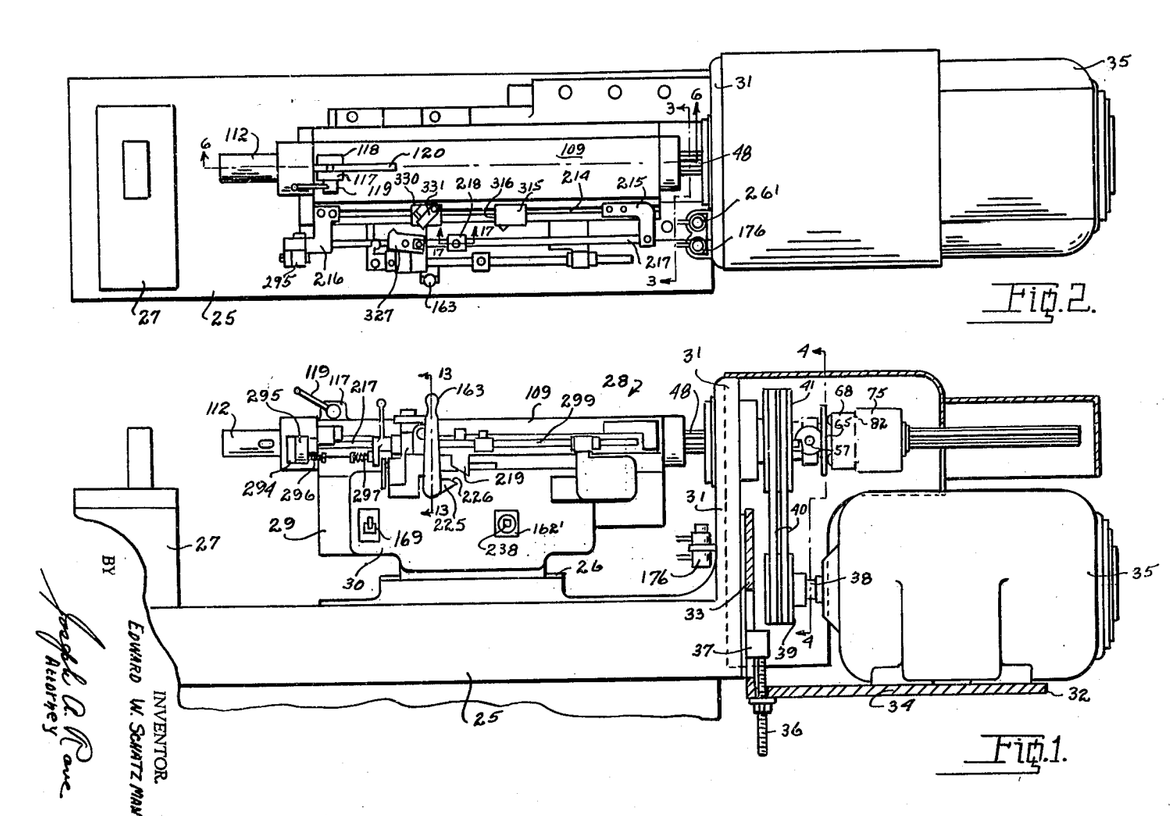
FIG. 1 is a fragmentary, elevational view of a drilling machine having incorporated therewith the torque control mechanism of the present invention.
FIG. 2 is a top plan view of the drilling machine illustrated in FIG. 1.
Figures 3, 4, 5, 6:
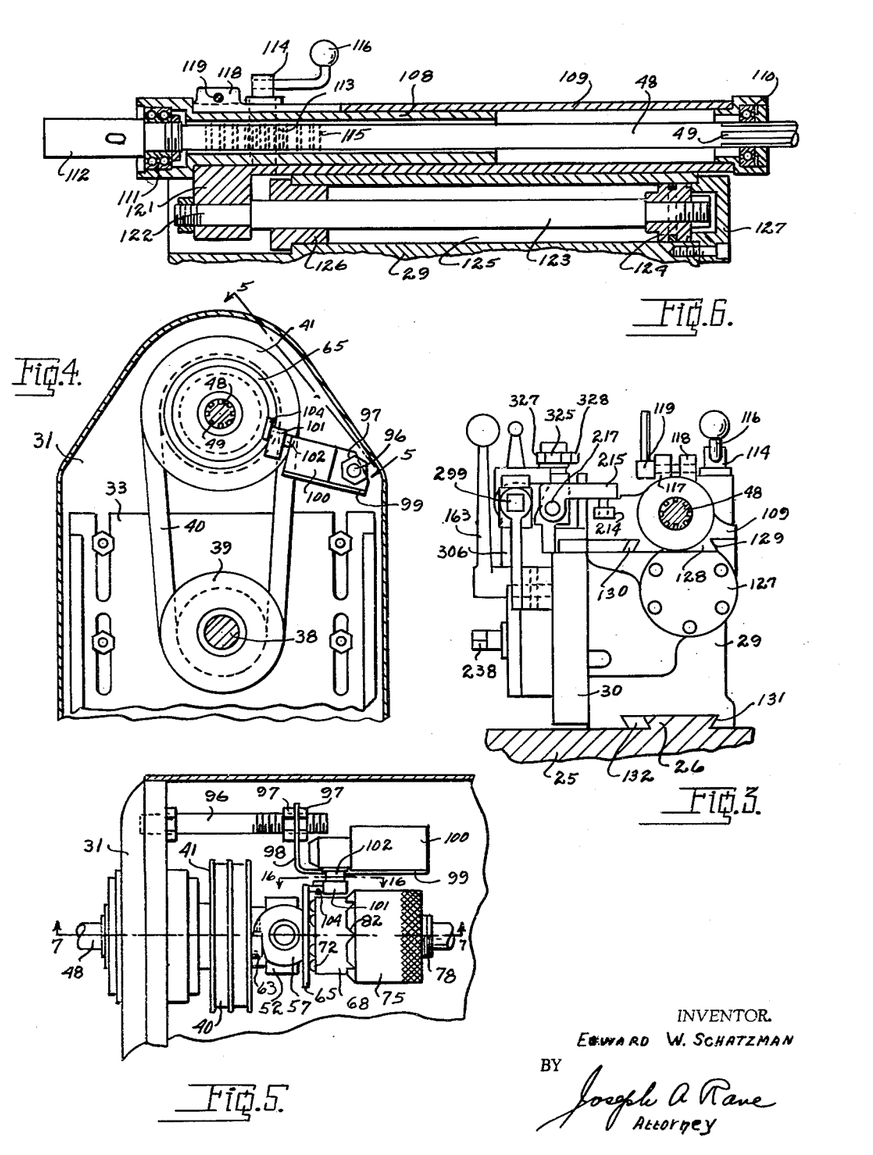
FIG. 3 is, in effect, a rear elevational view of the drilling unit as seen, specifically, from line 3—3 on FIG. 2.
FIG. 4 is an enlarged view partly in section and partly in elevation as seen from line 4—4 on FIG. 1.
FIG. 5 is a fragmentary, elevational view of a portion of the torque control mechanism as seen from line 5—5 on FIG. 4.
FIG. 6 is an enlarged, fragmentary, sectional view through the tool spindle actuating mechanism as seen from line 6—6 on FIG. 1.

The motor 35 rotates in a clockwise direction which through the belts 40 correspondingly rotates the spindle driving pulley 41. The rotation of the spindle driving pulley 41 in a clockwise direction is to the right as seen in FIG. 4 wherefore the abutments 63, from said pulley 41, will each engage its driven cam or dog 56 through their shoulders or vertical faces 59 to correspondingly rotate the nut 49 and thereby the spindle driving sleeve 43. The position of the parts illustrated in FIGS. 1 and 5 is the normal or idle position and upon initial rotation of the spindle sleeve pulley 41 the cams or dogs 56 are slightly rotatated about their individual studs 53, 54 and 55 to the position shown in solid lines in FIG. 8. In other words the flats 58 of each cam or dog 50 is slightly tilted from the vertical to a downwardly and inwardly inclined position as seen in FIG. 8 in solid lines which causes a slight compression in the springs 71. It is in this position of the parts that the spindle is being rotated during a drilling operation. The parts will be held in this position so long as the drill is freely cutting and has no torque or sticking pressure thereon greater than that which can be withstood by the drill.

Should, for some reason, the torque on the drill be increased, due to the gathering of chips in the hole being drilled, or a swelling of the drill due to friction heat, or for any other reason, and a resistance be set up to drill rotation, the driving spindle sleeve will tend to slow down in its rotation thereby tending to correspondingly hold back the rotation of the spindle driving pulley 41. Since the said spindle driving pulley is being constantly driven through the belts 40 the abutments 63 will constantly turn and will thereby cause the cams or dogs 56 to be rotated or oscillated about their respective studs 53, 54 and 55 from the solid line position of FIG. 8 to the phantom line position 105 thereof and will thereby shift the plate 65 from its solid line position in FIG. 8 to its phantom line position, indicated by the reference numeral 106, and correspondingly actuate the micro-switch arm 101 from its solid line position to its phantom line position 107 in FIG. 16. This immediately closes the contacts of the micro-switch to operate the control mechanism, to be later described, and withdraw the drill from the work.

From the foregoing it will now be appreciated that there has been provided a yieldable drive connection between a source of power and the spindle and which drive connection yields to excessive pressure on the drill due to an increase in torque thereon. It will further be appreciated that by adjusting the tension or yielding limit in this yieldable drive, the point of drill breakage can be so utilized that the drill is withdrawn in ample time to prevent the occurrence of drill breakage. It will further be appreciated that a high speed or sensitive drilling machine equipped with the yieldable drive just described will perform drilling operations of the step drilling type and the actual drilling performed until the point of breakage of the drill is nearly reached instead of withdrawing the drill when no danger exists.

The spindle 48 is mounted for rotation, at its outer end, in a quill 108, disposed for axial adjustment in a bore in a spindle carrier 109, see FIG. 6. The inner end of the spindle carrier 109 carries an anti-friction bearing 110 for the spindle 48. The other end of the spindle is mounted in an anti-friction bearing 111 carried by the quill 108 with the spindle projecting beyond the quill and provided with the usual chuck 112 for the drill or other tool.

The spindle 48 is axially adjustable relative to the carrier 109 by means of a rack pinion 113 carried by a shaft 114 rotatably journaled in the carrier 109. The rack pinion 113 meshes with a rack 115 formed integral with or secured to the quill 108. In order to rotate the pinion 113, its shaft 114 projects above the forward end of the carrier 109 and has secured thereto a crank or the like 116. The outer end of the carrier is split, and on each side thereof is a lug or ear 117 and 118, see FIG. 2, respectively provided with a tapped and a plain perforation receiving a clamping stud 119. This clamping stud draws the portions of the carrier on each side of the split 120 toward one another and thereby clamps the quill in adjusted positions.

The spindle carrier, and therefore the parts carried thereby, is actuated by hydraulic means toward and from the work, which means, as shown in FIG. 6, comprises a downwardly projecting lug 121 from the carrier 109 which has a perforation therein receiving the outer, reduced end 122 of a piston rod 123. The piston rod 123 has secured to its inner end a piston 124 which is movable through a cylindrical bore 125 in the tool head 29.

In order to prevent loss of fluid and pressure around the piston rod at its outer end, use is made of a suitably packed joint 126 carried by the outer end of the cylindrical bore 125. The inner end of the cylinder 125 is likewise suitably closed, as by a head 127.

The spindle carrier 109 is guided in its movement relative to the tool head 29, see FIG. 3, by means of a dovetailed guide 128 received in a correspondingly shaped guide-way 129 with a gib 130 between one side of the guide and the adjacent side of the guide-way. The tool head 29 is provided in its lower side with a dove-tailed guide-way 131 receiving the correspondingly shaped guide 26 formed, as noted above, on the upper surface of the bed 25. A gib 132 is disposed in the guide-way 131 between one side of the guide tongue 26 and the opposed side of said guide-way 131 for clamping the head in position on the said bed 25.

Figure 15:
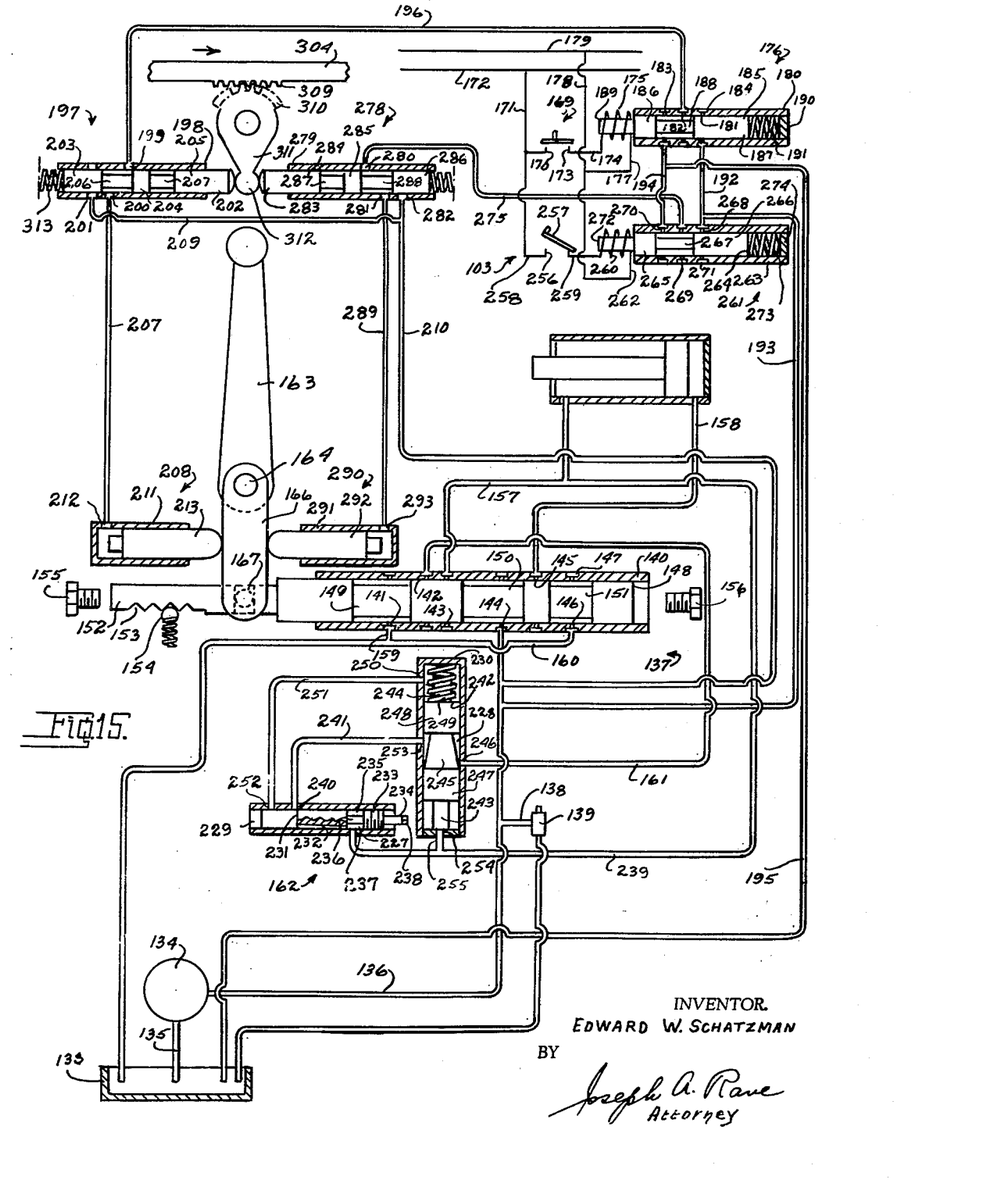
FIG. 15 is a diagrammatic view of the hydraulic and electrical control mechanism.

As was noted above, hydraulic or fluid means is preferably employed for actuating the piston 124, and therefore the spindle carrier, toward and from the work. This hydraulic mechanism is shown diagrammatically in FIG. 15 to which reference is now to be had, and the various valves and control means will be described in detail with reference to their diagrammatic disclosures and their structural illustrations in the other figures of the drawings, if their importance so requires, as they are encountered in a complete cycle of operation of the machine. As shown in FIG. 15, use is made of a tank or sump 133, which may be independent of the machine, though preferably is formed in some part of the bed, such as in the lower portion thereof. Mounted above the tank or sump 133 is a constantly rotating pressure circulating pump 134 having its intake or suction side connected by a pipe 135 with the sump or tank. The discharge side of the pump has extending therefrom the pressure pipe or conduit 136, terminating in the main control mechanism or valve indicated in general in FIG. 15 by the reference numeral 137. The pressure pipe or conduit 136 has connected therewith a branch pipe or conduit 138 which terminates in the sump or tank 133 with said branch pipe or conduit having intermediate its ends an adjustable relief valve 139. The relief valve 139 determines the actuating pressure in the system.

The main control valve 137 is diagrammatically illustrated in FIG. 15 as comprising a valve sleeve 140 which in practice is pressed into a valve block secured to the inner face of the head closure plate 30 which closes the open front side of the tool head 29, this mechanism is not structurally shown as it is only specifically incidental to the invention. The valve sleeve 140 has formed therethrough and radially thereof a plurality of sets of radial ports 141, 142, 143, 144, 145 and 146, each set of ports being encircled by a similar groove 147 formed circumferentially in the exterior of the sleeve 140. Disposed in the bore of the valve sleeve 140 is a spool type valve member 148 provided with reduced portions or cannelures 149, 150 and 151 adapted in different positions of adjustment to variously connect the several sets of ports in the valve sleeve 140.

The valve member 148 has four operative positions, and in order to determine these positions, it has projecting therefrom a stem 152 provided with V-shaped notches 153 cooperating with a spring pressed detent 154 carried by a suitable block which is secured to the inner face of the head closure plate 30, and therefore projects into the interior of the tool head 29. The position of the valve member 148, illustrated in the drawings, is the neutral or stop position, and the valve has a position to the left of that shown in FIG. 15, which is the retracting position. In order to limit the movement of the valve to the left in FIG. 15 use is made of a stop screw 155 that may be mounted on the block carrying the detent with said stop screw in alignment with the axis of the valve stem 152. A third position of the valve 148 is to the right of that shown in FIG. 15 which is the slow feed position to cause the tool to feed slowly through the work while a cut is being effected. The fourth position of the valve is to the extreme right in FIG. 15 which is the rapid advance position to cause a rapid approach of the tool to the work. This fourth position is finally determined by a stop screw 156 threaded into an appropriate fixed part of the tool head 29 and, again, in axial alignment with the valve, as diagrammatically illustrated.

As seen in FIG. 15, the radial ports 143 and 145 have, respectively, connected with them one end of pipes or conduits 157 and 158 which respectively terminate at ports located at inner and outer ends of the piston cylindrical bore 125. The ports 144 have connected therewith the outer end of the main pressure pipe or conduit 136, while the ports 141 and 146 have connected therewith pipes or conduits 159 and 160 which terminate in the sump or tank 133 and are, therefore, the return lines for the system from the main control valve mechanism. The remaining set of ports 142 of the piston valve sleeve 140 has connected therewith one end of a pipe or conduit 161 which terminates in a feed determining and balance valve mechanism, indicated in general in FIG. 15 by the reference numeral 162, and which will be later further described.

At the commencement of a tooling cycle, the valve 148 may be manually shifted by means of a lever 163, see FIG. 1, which is keyed or otherwise secured to the outer projecting end of a shaft 164 oscillatably journaled in a bushing 165 carried by the tool head cover plate 30. The inner, projecting, end of the shaft 164 has keyed or otherwise secured to it a lever 166 having at its free end a valve shifting pin 167 received in a slot 168 formed in the valve stem 152. This initial shifting of the valve member 148 is to the extreme right in FIG. 15 for thereby connecting the pressure ports 144 with the ports 145 and causing a flow of fluid from the conduit 136 to the conduit 158, and therefore the outer end of the cylinder 125 for actuating the piston 124 outwardly together with the parts connected therewith. The fluid ahead of the piston 124 is at this time being exhausted by way of pipe or conduit 157 to the ports 143 and to the pipes or conduits 159 and 160 by way of the ports 141 to the sump or tank 133. As was noted above, this movement of the piston and parts connected therewith is at a rapid rate in an outward direction or toward the work.

The starting of cycle of operation of the machine, the initial shifting of the valve member 148, instead of through the manually operated lever 163 is preferably effected through the closing of an electric starting switch, indicated by the reference numeral 169 and mounted on the forward face of the head closure plate 30. It is understood that this switch 169 may be, and frequently is, mounted on a control panel that may be remote from the machine.

As seen in FIG. 15 the switch 169 has its one contact 170 connected by an electrical conductor or wire 171 with one wire 172 of the main electric circuit. The switch 169 has its other contact 173 coneccted by a wire 174 with one end of a solenoid coil 175 associated with a hydraulic valve indicated in its entirety by the reference numeral 176. The other end of the solenoid coil 175 is connected by wires 177 and 178 with the second wire 179 of the main electrical circuit.

The valve 176 may be termed the starting valve and is shown mounted in operative position in FIG. 1 and as shown in said FIG. 1 said valve 176 along with its solenoid coil are mounted against the forward face of the base or bed upstanding support 31.

As shown diagrammatically in FIG. 15 the starting valve 176 comprises an enclosing sleeve 180 having formed radially therethrough a plurality of sets of ports 181, 182 and 183 with each set of ports connected by a groove 184 exteriorly of the sleeve 180.

Disposed within the valve sleeve 180 is a spool type valve member 185 having at its ends spools 186 and 187 connected by a reduced portion or cannelure 188 adapted to alternately connect ports 181 and 182 and 182 and 183. The valve member 185 has projecting from one end thereof a stem 189 which constitutes the movable core for the solenoid coil 175. One end of the valve sleeve 180 is closed as at 190 and said closure forms one abutment for a compressible coil spring 191 which normally centralizes the valve 185 at its normal position.

The valve sleeve 180 has its ports 181 connected with one end of a pipe or conduit 192 in turn having connected therewith one end of a pipe or conduit 193 that extends from the main pressure line or conduit 136 while the ports 183 of said valve sleeve 180 have connected therewith one end of a pipe or conduit 194 in turn having connected therewith one end of a pipe or conduit 195 that terminates in the sump or tank 133.

The remaining set of ports 182 of the valve sleeve 180 has connected therewith one end of a pipe or conduit 196 terminating at its other end in a pilot valve mechanism indicated in its entirety by the reference numeral 197.

From the foregoing it should be noted that the closing of the starting switch 169 energizes the solenoid coil 175 for shifting the starting valve member 185 against the resistance of spring 191 and connecting the hydraulic pressure from the main pressure pipe or conduit 136 through the pipes or conduits 193 and 192 to the pipe or conduit 196 and therefore to the pilot valve 197.

The pilot valve 197 is carried by a valve block on the inner surface of the head closure plate 30 and, as diagrammatically illustrated in FIG. 15 comprises a valve sleeve 198 having formed radially therethrough a plurality of ports 199, 200 and 201. Disposed within the valve sleeve 198 is a spool type valve and plunger member 202 having thereon spool portions 203, 204 and 205 with said spool portions 203 and 204 connected by a reduced portion or cannelure 206 and said spool portions 204 and 205 similarly connected by a reduced portion or cannelure 207.

The pilot valve sleeve 198 has connected with its ports 199 the other end of the pipe or conduit 196 while the ports 200 have connected therewith one end of a pipe or conduit 207 having its other end connected with a valve shifter mechanism indicated in its entirety by the reference numeral 208 which effects the shifting of the main valve member 148. The remaining set of ports 201 in the pilot valve sleeve 198 has connected therewith one end of a pipe or conduit 209 having its other end connected with a pipe or conduit 210 that terminates in the main pressure pipe or conduit 136.

The valve shifting mechanism 208 is carried by the head closure plate 30 to be interiorly of the head 29 with said valve shifter mechanism including a cylinder 211 closed at one end and provided with a port 212 with which the other end of the pipe or conduit 207, supra, connects. Disposed within the cylinder 211 is a piston plunger 213 adapted to have its inner end subjected to hydraulic pressure within the closed end of the cylinder 211.

The piston plunger 213 projects outwardly of the cylinder 211 and has contact with the valve shifting lever 166 which as noted above has a pin and slot connection with the main valve 148 for actuating the same.

From the foregoing, it will now be noted that the operation of the starting valve member 185 through the closing of the starting switch 169 and the connection of the hydraulic pressure with the pilot valve 197 has the said pressure connected with the pipe or conduit 207 and the piston plunger mechanism 208 for thereby actuating piston plunger 213 and through the lever 166 shifting the main control valve member 148 to its extreme right hand position so that the rapid advance movement is imparted to the tool or drill carrier the same as above set forth with respect to the manual operation of lever 163. It should be noted that the lever 163, for a purpose subsequently to be made clear, is at the same position whether manually effected or mechanically effected by the piston plunger 213.

The rapid advance movement of the carrier continues until the drill or tool is about to strike the work, whereupon this movement is changed to a relatively slow feed rate of movement. In order to accomplish this, the tool carrier 109 is provided therein with a T-shaped slot 214, see FIG. 3, which extends the length of the carrier and has secured therein at its inner end a bracket or arm 215, and at its outer end a bracket or arm 216, see FIG. 2. Carried by the brackets or arms 215 and 216 is a rod or bar 217, shown in the drawings as of angular cross-section. Mounted on this rod is the cumulative rapid traverse stop dog 218 which, as seen in FIG. 1, is provided with a cam shaped nose 219 on one side of the rod 217, and as seen in FIG. 17 with a cylindrical boss 220 on the other side of said rod 217. The boss 220 is hollow to accommodate a friction shoe 221 backed up by a spring 222 whose tension may be adjusted by screw 223. The cam nose 219 provides an inclined cam face 224 operable to change the rapid movement of the tool carrier to a slow feed movement as will now be made clear.

The manual control lever 163 has projecting from one side thereof of a finger 225 having a cam face 226 at such an angle as to be engaged by the cam face 224 of the cumulative stop dog 218. When the cycle of operation was started, whether by manually actuating the lever 163 or by power shifting the main control valve 148, the said lever 163 was actuated to the left thereby upwardly shifting the lever finger 225 from the position illustrated in FIG. 1. This operation placed the finger cam face 226 in the path of movement the cam face 224 of the cumulative stop dog 218, and at the same time shifted the main control valve 148 to its extreme right hand position. The cumulative stop dog cam face 224 engaging the lever finger cam face 226 and actuates the said lever to a position for shifting the main valve to the feed position, that is, to a position intermediate its neutral or stop position illustrated in FIG. 15 and its extreme right hand or rapid advance position.

From this, it will be seen that the cumulative rapid traverse stop dog 218 is adjustably positioned on the rod 153 to engage the lever finger 225 at the point where the drill or tool is about to engage the work. The oscillation of the lever 163 is a clockwise direction, as seen in FIG. 1, through the shaft or stud 164 and arm 166, shifts the valve member 148 to a position for cutting off the flow of the exhaust fluid through the pipe or conduit 157 and therefore the unrestricted port 143. This flow is directed, instead, from the pipe or conduit 157 to the feed rate determining and balance valve, referred to above and indicated in general in FIG. 15 by the reference numeral 162.

This feed determining and balance valve 162 as shown diagrammatically in FIG. 15 contemplates a suitable valve block 162', see FIG. 1, carried by the head closure plate 30 to project into the interior of the head 29. The said valve block, as diagrammatically illustrated in FIG. 15, would be provided therethrough with a pair of bores 227 and 228, one for the feed valve the other for the balance valve, each of which bores is closed at one end as at 229 and 230, respectively. Disposed in the valve bore 227, shown in FIG. 15 as a sleeve, is a valve member 231 having an inclined groove 232 formed longitudinally in one side thereof. The valve member 231 is provided adjacent one end of its groove with an enlarged threaded portion 233 threaded into the valve bore 227, while the other end of said groove opens into the bore 227. Projecting from the threaded portion 233 is the valve stem 234, having its end provided with a portion to receive a suitable wrench, key or the like whereby the valve may be turned to effect its adjustment through its enlarged threaded portion 233.

The most shallow portion of the groove 232 is adjacent to a chamber 235 formed by a reduced portion 236 in the valve member 231 and this reduced portion establishes the minimum rate of flow through the groove, and therefore the slowest rate of feed of the tool. The valve bore 227 is provided with several ports, one of which ports 237, cooperates with the groove and depending upon the position of the groove with regard to the said port 237 depends rate of feed movement. In order that the valve 231 may be adjusted to variously position its groove 233 with respect to the port 237 the valve stem 234, as noted above, is provided with an end of angular cross-section 238.

In practice this valve stem 234 and its end 238 may project outwardly of the head closure plate as seen in FIG. 1.

The valve bore port 237 has connected therewith one end of a pipe or conduit 239 which terminates at its other end in the pipe or conduit 157 from the outer end of the piston cylinder 125.

The cylinder bore 227 has a second port 240 with which is connected one end of a pipe or conduit 241 that terminates at its other end in the valve bore 228 in which is disposed the balance valve mechanism, to be presently described, and with said port 240 located at the outer end of the feed valve member 231.

The balance valve mechanism comprises a valve member 242 disposed, as noted above, in the valve bore 228 and which valve member has reduced stem portions 243 and 244 at opposite ends thereof, together with a reduced portion 245. This reduced portion controls flow through a port 246 and with which is connected one end of the pipe or conduit 161 from the main valve mechanism 137.

The valve member 242 is illustrated as having spool portions 247 and 248 respectively having outwardly extending therefrom the valve stems 243 and 244 and with said spool portions having the reduced portion 242 between them. Surrounding the stem 244 is a spring 249 which abuts on one end with the spool 248 and on the other end with the valve bore end closure 230.

The valve bore 228 has extending therefrom a port 250 with which is connected one end of a pipe or conduit 251 that terminates at its other end in a port 252 in the valve bore 227. The said pipe or conduit 251 connects the outer ends of the valve bores 227 and 228, namely, the portion of the valve bore 227 ahead of the valve member 231 and the portion of the valve bore 228 in which is disposed the balancing spring 249. It should be noted at this time that the pipe or conduit 241 from the valve bore 227 is from the portion of the bore ahead of the valve member 231 and terminates in a port 253 in the valve bore 228 at the portion thereof including the reduced portion 245 of the valve member 242. The valve bore 228 has a port 254 from the portion thereof in which is disposed the stem 243 of the valve member 242 and with said port 254 having connected therewith one end of a pipe or conduit 255 that terminates at its other end in the pipe or conduit 239 which in turn extends from pipe or conduit 157, supra.

As was noted above the feed valve member 231 is adjusted so that the desired point in its inclined groove 232 effectively empties into the space 235 around the said valve member reduced portion 233 and thereby the port 237 to feed the tool carrier and tool at the desired speed. The balance valve member 242 is for the purpose, as is well known, to maintain a constant flow of the hydraulic medium as determined by the aforementioned setting of the feed valve member 231.

Briefly the operation of the balance valve in conjunction with the feed valve is as follows:

The flow from the exhaust pipe or conduit 157 from the cylinder 125, when the tool is moving at a feed rate, is by way of the pipes or conduits 239 and 255 to the cannelure space 235 and to the portion of the valve bore 228 that encloses the valve stem 243 where such pressure acts on the balance valve member 242 for actuating it against the resistance of spring 249 while at the same time there is flow through the groove 232 of valve member 231. The flow through the groove 232 is into the valve bore portion 227 ahead of the valve member 231 and then through ports 240 and 252 and through conduits 241 and 251. The flow through the pipe or conduit 251 into the portion of the valve bore 228 that enclosed the spring 249 combines with the force of said spring 249 for positioning the valve member 242 to act against the pressure in the portion of the valve bore 228 that encloses the valve stem 243. These pressures balance one another for positioning the valve member 242 for more or less opening the port 246 and controlling the flow through the pipe or conduit 161 and therefore maintaining and controlling the rate of feed of the tool carrier as set up by the positioning of valve member 231. The flow through the pipe or conduit 161 to the main control valve is connected with the pipes or conduits 159 and 160 and the sump or tank 133.

The slow feeding movement of the tool continues until the tool carrier is reversed for withdrawing the tool from the work. The reversal of the tool carrier may be accomplished through either of two instrumentalities, either after the work has been completely drilled or when the torque on the drill reaches a point near the safe torque load on the drill.

Since the yieldable or torque drive on the spindle and its control mechanism have been previously described its connection with the operating mechanism will first be disclosed.

Within the housing of the micro-electric switch 100 is a fixed contact 256 and a movable contact 257, said movable contact is operated by the oscillatable stud 102. The fixed contact is connected by a wire 258 to the wire 171 and therefore the wire 172 of the electric source. The movable contact 257 is connected by a wire 259 with one end of a solenoid coil 260 associated with a valve mechanism that may be termed a rapid reverse valve and indicated in its entirety by the reference numeral 261. The other end of the solenoid coil 260 is connected by a wire 262 with the wire 178 from the main electric source wire 179.

The valve 261 is quite similar to the starting valve 176, above described, and is mounted, preferably, adjacent the said starting valve on the forward face of the bed upstanding support 31. The said valve 261 comprises a valve sleeve 263 having therein a valve member 264 of the spool type and including spool portions 265 and 266 with a reduced portion or cannelure 267 between said spool portions.

The valve sleeve 263 is provided with a plurality of ports 268, 269 and 270 with each set of ports connected by a circumferential groove 271 in the exterior of the sleeve 263. The ports 268 and 270 are connected with one another through the cannelure 267 when the valve member 264 is in its normal position, said position being illustrated in FIG. 15, and said ports 269 and 268 being connected with one another when the said valve member 264 is shifted to its second position.

The valve member 264 is shifted to its second position by the solenoid coil 260 and for which purpose the valve member 264 has projecting from one end thereof a stem portion 272 which acts as the core for the solenoid coil 260. The valve member 264 is retained in its normal position by a spring 273 disposed within the valve sleeve 263 and abutting on one end with the said valve member 264 and on the other end with the valve sleeve closure member 274.

The valve sleeve ports 270 have connected therewith the other end of the pipe or conduit 194 from the starting valve sleeve 180 and since the said pipe or conduit 194 has connected therewith one end a pipe or conduit 195 the said ports 270 are connected with the sump or tank 133. The ports 268 of the valve sleeve 263 have connected therewith the other end of the pipe or conduit 192 from the starting valve sleeve 180 and since said pipe or conduit 192 has connected therewith one end of pipe or conduit 193 the said ports 268 are connected with the main pressure pipe or conduit 136 and therefore the hydraulic pump.

The remaining ports 269 of the valve sleeve 263 have connected therewith one end of a pipe or conduit 275 which terminates at its other end in a pilot valve indicated in its entirety by the reference numeral 278. The pilot valve mechanism 278 is quite similar in its construction and operation to the pilot valve 197 above described. The said pilot valve mechanism 278 includes a valve sleeve 279 having formed radially therethrough ports 280, 281 and 282 and it is with the ports 280 that the other end of the pipe or conduit 275 connected.

Within the valve sleeve 279 is a spool type valve and plunger member 283 having spool portions 284, 285 and 286 with said spool portions having reduced portions or cannelures 287 and 288 between them.

The valve sleeve 279 has connected with its ports 282 the one end of the pipe or conduit 210 which has its other end connected with the main pressure pipe or conduit 136. The remaining ports 281 of the valve sleeve 279 have connected therewith one end of a pipe or conduit 289 which has its other end connected with a piston plunger mechanism 290 substantially similar to the piston plunger mechanism 208 above described.

The piston plunger mechanism 290 comprises a sleeve or cylinder 291 in which is disposed a piston plunger 292 that has its outer end in contact with the valve actuating link or arm 166. The piston plunger sleeve or cylinder 291 is provided with a port 293 with which is connected the other end of the pipe or conduit 289.

From the foregoing, it will now be seen that a slowing down of the spindle 48 due to an increase in torque on the drill or other tool which causes the closing of the micro-switch contacts 256 and 257 will operate the solenoid 260 and thereby shift the main control valve mechanism 137 to the left, as seen in FIG. 15, and effect thereby a rapid retraction of the piston 124 and parts carried thereby. It is believed obvious that the shifting of the main valve mechanism 137 will effect this operation since the pressure in pipe or conduit 136 will be connected with the pipe or conduit 157 and the outer side of the piston 124. The exhaust fluid from the other side of the piston 124 flows through pipe or conduit 158 to the pipe or conduit 160 and the sump 133.

The rapid retraction of the spindle carrier and parts associated therewith continues until the carrier is reversed to again forwardly advance to work drilling position. The means and mechanism disclosed in the drawings for effecting this reversal includes a collar 294, secured to the outer end of the dog rod 217. The collar 294 has pivotally connected with it an arm 295 carrying an abutment pin 296 adapted to engage the outer end of a pin 297, illustrated most clearly in FIGS. 1 and 14. The pin 297 is mounted in a cylindrical portion or housing of a lever or arm 298 pinned or otherwise secured to an oscillatable rod 299. The rod 299 is journaled for oscillation at its inner end in a bracket 300 carried by the tool head closure plate 30, and is further journaled at its outer end in a bracket 301, likewise carried by the tool head closure plate 30. As will be seen from FIG. 14, the lever or arm 298 has abutting it one end of a coil spring 302 that surrounds the pin 297 and said spring 302 at its other end abuts with the head 303 of the pin 297 for maintaining a collar 304' on the pin in its normal operative position. The normal position of the pin 297 is in line with the pin 296 and a valve actuating slide 304, which it, in effect, engages during the retracting or withdrawal movement of the spindle carrier for thereby inwardly shifting the said slide 304, as seen in FIG. 14.

The slide 304 is adapted to slide on the top face of the head closure 30 of the tool head 29. The slide 304 is retained in position by a flange 305 projecting from a bracket 306 secured to the head closure plate 30. This slide 304 has projecting from its forward end a pin 307, in turn, having at its forward end a plate 308 in line with the pin 296. The slide is provided intermediate its ends with rack teeth 309 meshing with a segmental gear 310, rotatably mounted on the bushing 165 carried by the tool head plate 30.

The segmental gear 310 has projecting downwardly thereof an arm 311 provided at its lower end with a circular head 312 having contacting on opposite sides thereof the pilot valve members 202 and 284. The pilot valve members 202 and 284 are associated with valve mechanisms which operate the piston plungers 213 and 292 for shifting the main control valve member 148, see FIG. 15.

This inward movement of the slide 304, through its rack teeth 309, oscillates the arm 311 for shifting the valve member 202 of pilot valve mechanism 197. The pilot valve mechanism 197, as noted above, is shown diagrammatically in FIG. 15 and has contacting with one end of its valve member 202 one end of a coil spring 313, which has its other end seated in the valve block, not shown, that houses the valve member 202. The spring 313 is utilized to return the parts to their normal positions when pressure on the slide 304 is removed.

The shifting of the slide 304 and the oscillation of the arm 311 shifts the valve member 202 of the valve mechanism 197 so that its cannelure or reduced portion 206 connects the ports 200 and 201 thereby connecting the hydraulic pressure medium from the pump 134 through the pipes or conduits 136, 210 and 209 with the pipe or conduit 207 with the piston plunger mechanism 208. The hydraulic medium actuates the piston plunger 213 of the piston plunger mechanism 208 to the right as seen in FIG. 15 thereby actuating the valve shifting lever 166 in a counter-clockwise direction.

The actuation of the lever 166 in said counter-clockwise direction actuates the valve member 148 of the valve mechanism 137 to its right hand position and thereby connects the hydraulic medium from the pump 134 with the tool carrier piston for advancing same at a rapid rate in a tool feeding direction, outwardly, as seen in FIG. 1.

It should be noted that the rapid traverse withdrawal of the tool carrier from the point of torque overload was to a point from which its second rapid advance movement took place that was short of the initial position of the tool carrier and from which initial position the tool carrier was first rapidly advanced through the actuation of either the main control lever 163 or through the actuation of the remote control switch 169.

Immediately after the cumulative rapid traverse dog 218 actuates the main control lever 163 it engages and is held by the bracket 306 through the dog rod 217. The frictional engagement of the said cumulative rapid traverse dog with its rod is such that it actuates the said main control lever but this frictional connection is not such that, while being held, it interferes with the movement of the spindle carrier in its slow feeding direction. From this it follows that the second, and subsequent, rapid traverse advancing movements of the spindle carrier continues to the point where the previous slow feeding movement thereof stopped, except, as will presently be pointed out, when the spindle carrier is returned to its initial position for operation on a new work piece.

The second rapid advance of the tool carrier 109 continues outwardly until the rapid traverse cumulative dog 218 again through its cam nose 219 engage the finger 225 of the manual control lever 163 whereupon the rate of movement of the tool carrier is again reduced to the slow feed as above indicated and which slow movement continues until the torque control mechanism again operates to withdraw the tool carrier or until the work has been completely drilled and in the latter operation the tool carrier is returned to its initial position.

The mechanism for returning the carrier to its initial position and stopping the mechanism comprises a dog 315, see FIGS. 2 and 18, which has a forward face 316 and is adjustably positioned in the T-slot 214 of the tool carrier. This dog 315 is adjusted to the point where it comes into operation after the work has been completely drilled or bored and is adapted to engage a finger 317, see FIGS. 13 and 18, upstanding from the valve actuating rack slide 304.

The actuation of the rack slide 304 is in the opposite direction to that previously set forth or to the left as seen in the drawings. This actuation of the rack slide through its rack teeth 309 operates the segmental gear 310 and arm 311 for actuating the pilot valve mechanism 278, see FIG. 15.

The actuation of the pilot valve mechanism 278, actually the shifting of the valve member 283, through its reduced portion or cannelure 288 connects the ports 281 and 282 for thereby connecting the pressure medium from the pump 134 and pipes 136 and 210 with the pipe or conduit 289 and the piston plunger mechanism 290. The energization of the piston plunger mechanism 290 causes an outward, leftward, movement of the piston plunger 292 therein for actuating the lever 166 in clockwise direction, as seen in FIG. 15, and thereby shifts the main valve member 148 to its left hand position as determined by the stop screw 155.

The shifting of the said main control valve member 148 to its left hand position effects a rapid retraction of the tool carrier as above set forth. This time, however, the said shifting of the main valve member was effected by a mechanical device in no wise connected with the torque on the tool spindle.

The dog 315 has mounted therein a plunger 318 which is normally outwardly projecting from the said dog and with said projection being maintained by a spring 319 behind said plunger. The said plunger is adapted to set up the mechanism to prevent automatic reversal of the spindle carrier since the said work has now been completely drilled or bored.

Figures 12, 13:
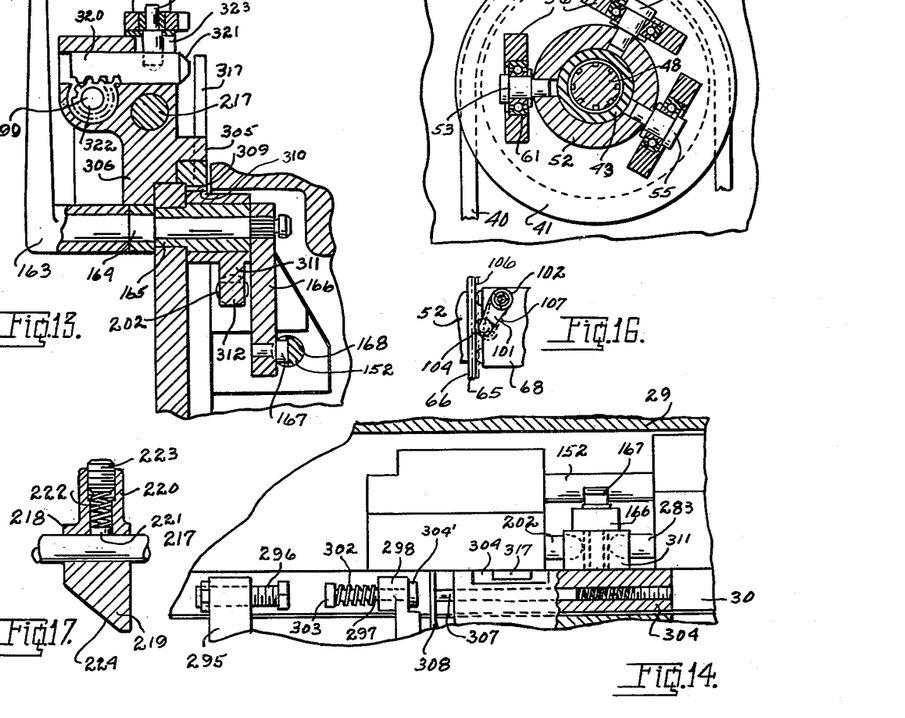
FIG. 12 is a transverse, sectional view through the torque control device taken through a plane ahead of the plane of FIG. 9 on line 12—12 on FIG. 7.
FIG. 13 is a fragmentary, enlarged, sectional view through the main control lever as seen from line 13—13 on FIG. 1.

The operation of this mechanism is as follows:

The bracket 306, supra, is provided with a transverse bore in which is disposed a plunger 320 having a cone or tapered end 321 projecting inwardly of the bracket, see FIG. 13. The plunger 320, in effect, is a rack having its teeth meshed with a pinion 322 on the dog bar 299, carried by the head closure plate 30, supra. The bracket 306 is provided above the plunger 320 with a slot 323 through which projects a pin 324 carried by and movable with the plunger 320. The pin 324 has on its upper end a shoe 325 disposed in a slot 326 at one end of a lever 327 pivotally mounted on the upper surface of the bracket 306. The lever 327 has at its end a point 328 which extends inwardly toward the head 29.

In operation the dog 315 has the end of its plunger 318 engage the tapered nose 321 of the rack plunger 320 and said plunger 318 is actuated inwardly of the dog and said plunger snaps at its normal position at about the time the face 316 of said dog 315 engages the rack slide finger 317. Upon reversal, that is, rapid retraction of the spindle carrier, the dog plunger 318 again engages the nose 321 of the rack plunger 320 but now outwardly, to the left as seen in FIG. 13, actuates said rack plunger for rotating the pinion 322 and thereby rotating or oscillating the dog bar 299.

The oscillation of said dog bar 299 carries with it the arm 295 and therefore the pin 297 so that the adjustable abutment 296 on the tool carrier dog bar 217 cannot actuate the valve actuating slide rack 304 to effect an operation thereof as above set forth.

The spindle carrier continues, therefore, in a retracting direction until the said spindle carrier is fully retracted so that the completed work piece may be replaced by an incompleted one.

Mounted on the oscillatable dog rod 299 is a rapid traverse cumulative dog reset dog 329 which is projected into the path of movement of the said cumulative rapid traverse dog 218 for holding same during the final retraction of the tool carrier, in other words, the dog 329 resets the cumulative rapid traverse dog to its initial position so that after replacement of the work piece the spindle carrier may advance to the point where the tool is ready for operation.

In order to reset the automatic cycle of the machine the spindle carrier has further secured in its T-slot 214 a reset dog 330 including a spring biased oscillatable flipper 331. The said reset dog 330 is mounted near the forward end of the spindle carrier wherefore it is ahead of the lever 327 and particularly its pointed finger 328 when final reversal of the tool carrier was effected. The flipper 331 is so mounted that upon said retraction of the spindle carrier the said pointed finger or nose 328 harmlessly actuated the same. After the replacement of the finished work piece with an unfinished one and an advancement of the said spindle carrier from its initial remote position is effected, the said flipper 331 then engages the said finger or nose 328 for actuating the lever 327 in a counter-clockwise direction, as seen in FIG. 18, and thereby positioning the rack plunger 320 to its normal, or inner, position so that the spindle carrier may be automatically controlled after the completion of each work piece.

From the foregoing, it will now be noted that there has been provided a machine which is reversible upon the development of torque on the tool that which it can safely carry and that the machine will completely finish a work piece in the absence of such torque. The torque control mechanism is extremely sensitive and is accurately adjustable and permanently locked at the torque control point.

It is believed the foregoing accomplishes the objects initially set forth.

What is claimed is:

1. In a torque control mechanism of the class described the combination of a driven sleeve for rotating a tool, a yieldable coupling associated with said driven sleeve yieldable to torque on said sleeve and including a plate encircling the driven sleeve and movable axially thereof, a barrel secured to said driven sleeve in spaced relation behind the plate, a plurality of coil springs axially of said barrel circumferentially of the driven sleeve, a nut having a front face and a rear face threaded on said driven sleeve in spaced relation behind said barrel and threadedly adjustable toward said barrel, said springs being under compression between the plate and the front face of the nut yieldably resisting plate movement axially of the driven sleeve, said nut having a radial groove between its front face and rear face providing in said nut a radial flange including the nut rear face with said flange radially transversely cross-cut between diametrically opposite points on the periphery of the nut to provide a plurality of ears, and means associated with each ear for actuating the same relative to the nut and driven sleeve for impinging each ear on the driven sleeve threads for locking the nut in position.

2. In a torque control mechanism of the class described the combination of a driven sleeve for rotating a tool, a yieldable coupling associated with said driven sleeve yieldable to torque on said sleeve and including a plate encircling the driven sleeve and movable axially thereof, a barrel secured to said driven sleeve in spaced relation behind the plate, a plurality of coil springs axially of said barrel circumferentially of the driven sleeve, a nut having a front face and a rear face threaded on said driven sleeve in spaced relation behind said barrel and threadedly adjustable toward said barrel, said springs being under compression between the plate and the front face of the nut yieldably resisting plate movement axially of the driven sleeve, said nut having a radial groove between its front face and rear face providing in said nut a radial flange including the nut rear face with said flange radially transversely cross-cut between diametrically opposite points on the periphery of the nut to provide a plurality of ears, and a headed clamp screw threaded into the nut extending through each ear transversely of the groove with its head on the rear face of the nut operable to actuate the ears axially relative to the nut and driven sleeve and impinge each ear on the driven sleeve threads for locking the nut in position.

3. In a torque control mechanism of the class described the combination of a driven sleeve for rotating a tool, a yieldable coupling associated with said driven sleeve yieldable to torque on said sleeve and including a plate encircling the driven sleeve and movable axially thereof, a barrel secured to said driven sleeve in spaced relation behind the plate, a plurality of coil springs axially of said barrel circumferentially of the driven sleeve, a nut having a front face and a rear face threaded on said driven sleeve in spaced relation behind said barrel and threadedly adjustable toward said barrel, said springs being under compression between the plate and the front face of the nut yieldably resisting plate movement axially of the driven sleeve, means between each coil spring and the plate providing the contact between said coil springs and plate, said nut having a radical groove between its front face and rear face providing in said nut a radial flange including the nut rear face with said flange radially transversely cross-cut between diametrically opposite points on the periphery of the nut to provide a plurality of ears, and means associated with each ear for actuating the same relative to the nut and driven sleeve for impinging each ear on the driven sleeve threads for locking the nut in position.

4. In a torque control mechanism of the class described the combination of a driven sleeve for rotating a tool, a yieldable coupling associated with said driven sleeve yieldable to torque on said sleeve and including a plate encircling the driven sleeve and movable axially thereof, a barrel secured to said driven sleeve in spaced relation behind the plate, a plurality of coil springs axially of said barrel circumferentially of the driven sleeve, a nut having a front face and a rear face threaded on said driven sleeve in spaced relation behind said barrel and threadedly adjustable toward said barrel, said springs being under compression between the plate and the front face of the nut yieldably resisting plate movement axially of the driven sleeve, means between each coil spring and the plate providing the contact between said coil springs and plate, compressing means between each spring and nut operable for compressing the springs upon adjustment of the nut toward the barrel, said nut having a radial groove between its front face and rear face providing in said nut a radial flange including the nut rear face with said flange radially transversely cross-cut between diametrically opposite points on the periphery of the nut to provide a plurality of ears, and means associated with each ear for actuating the same relative to the nut and driven sleeve for impinging each ear on the driven sleeve threads for locking the nut in position.

5. In a torque control mechanism of the class described the combination of a driven sleeve for rotating a tool, a yieldable coupling associated with said driven sleeve yieldable to torque on said sleeve and including a plate encircling the driven sleeve and movable axially thereof, a barrel secured to said driven sleeve in spaced relation behind the plate, a plurality of coil springs axially of said barrel circumferentially of the driven sleeve, a nut having a front face and a rear face threaded on said driven sleeve in spaced relation behind said barrel and threadedly adjustable toward said barrel, a sleeve extending forwardly of the nut exteriorly of the barrel for a distance less than the length of the barrel, cooperating indicia on said barrel and sleeve indicating relative compression of the springs upon threaded adjustment of the nut toward and from the barrel, said springs being under compression between the plate and the front face of the nut yieldably resisting plate movement axially of the driven sleeve establishing the permissible torque on the driven sleeve, said nut having a radial groove between its front face and rear face providing in said nut a radial flange including the rear face with said flange radially transversely cross-cut between diametrically opposite points on the periphery of the nut to provide a plurality of ears, and means associated with each ear for actuating the same relative to the nut and driven sleeve and impinging each ear on the driven sleeve threads for locking the nut in position.

6. In a torque control mechanism of the class described the combination of a driven sleeve for rotating a tool, a yieldable coupling associated with said driven sleeve yieldable to torque on said sleeve and including a plate encircling the driven sleeve and movable axially thereof, a barrel secured to said driven sleeve in spaced relation behind the plate, a plurality of bores axially of said barrel circumferentially of the driven sleeve, a coil spring in each barrel bore, a nut having a front face and a rear face threaded on said driven sleeve in spaced relation behind said barrel and threadedly adjustable toward said barrel, a ball-bearing in each barrel bore between the forward end of the spring therein and plate for establishing a point contact bearing between each spring and the plate, said springs being under compression between the plate and the front face of the nut establishing permissible torque on said driven sleeve, said nut having a radial groove between its front face and rear face providing in said nut a radial flange including the rear face and with said flange radially transversely cross-cut between diametrically opposite points on the periphery of the nut to provide a plurality of ears, and means associated with each ear for actuating same relative to the nut and driven sleeve and impinging each ear on the driven sleeve threads for locking the nut in position.

7. In a torque control mechanism of the class described the combination of a driven sleeve for rotating a tool, a yieldable coupling associated with said driven sleeve yieldable to torque on said sleeve and including a plate encircling the driven sleeve and movable axially thereof, a barrel secured to said driven sleeve in spaced relation behind the plate, a plurality of bores axially of said barrel circumferentially of the driven sleeve, a coil spring in each barrel bore, a nut having a front face and a rear face threaded on said driven sleeve in spaced relation behind said barrel and threadedly adjustable toward said barrel, a ball-bearing in each barrel bore between the forward end of the spring therein and plate for establishing a point contact bearing between each spring and the plate, a plunger in each barrel bore between the rear end of the spring and the forward face of the nut operable axially of the barrel upon adjustment of the nut toward the barrel, said springs being under compression between the plate and the front face of the nut establishing permissible torque on said driven sleeve, said nut having a radial groove between its front face and rear face providing in said nut a radial flange including the rear face and with said flange radially transversely cross-cut between diametrically opposite points on the periphery of the nut to provide a plurality of ears, and means associated with each ear for actuating same relative to the nut and driven sleeve and impinging each ear on the driven sleeve threads for locking the nut in position.

8. In a torque control mechanism of the class described the combination of a driven sleeve for rotating a tool, a yieldable coupling associated with said driven sleeve yieldable to torque on said sleeve and including a plate encircling the driven sleeve and movable axially thereof, a barrel secured to said driven sleeve in spaced relation behind the plate, a plurality of bores axially of said barrel circumferentially of the driven sleeve, a coil spring in each barrel bore, a nut having a front face and a rear face threaded on said driven sleeve in spaced relation behind said barrel and threadedly adjustable toward said barrel, a ball-bearing in each barrel bore between the forward end of the spring therein and plate for establishing a point contact bearing between each spring and the plate, a plunger in each barrel bore between the rear end of the spring and the forward face of the nut operable axially of the barrel upon adjustment of the nut toward the barrel, a sleeve extending forwardly of the nut exteriorly of the barrel for a distance less then the length of the barrel, cooperating indicia on said barrel and sleeve indicating relative compression of the springs upon threaded adjustment of the nut toward and from the barrel, said springs being under compression between the plate and the front face of the nut yieldably resisting plate movement axially of the driven sleeve establishing permissible torque on said driven sleeve, said nut having a radial groove between its front face and rear face providing in said nut a radial flange including the rear face and with said flange radially transversely cross-cut between diametrically opposite points on the periphery of the nut to provide a plurality of ears, and means associated with each ear for actuating same relative to the nut and driven sleeve and impinging each ear on the driven sleeve threads for locking the nut in position.

(References on following page)

References Cited by the Examiner

UNITED STATES PATENTS

| | | | |
|---|---|---|---|
| 171,898 | 1/76 | Wiles. | |
| 2,562,170 | 7/51 | Busemeyer | 77—29 |
| 2,773,370 | 12/56 | Intraub et al. | 64—29 |
| 2,983,121 | 5/61 | Naas | 64—29 |

FOREIGN PATENTS

| | | |
|---|---|---|
| 4,164 | 1915 | Great Britain. |
| 256,607 | 3/49 | Switzerland. |

WILLIAM W. DYER, Jr., *Primary Examiner.*

JOHN C. CHRISTIE, *Examiner.*